US011086911B2

(12) United States Patent
Jagan et al.

(10) Patent No.: US 11,086,911 B2
(45) Date of Patent: Aug. 10, 2021

(54) METHOD AND SYSTEM FOR GENERATING QUESTION VARIATIONS TO USER INPUT

(71) Applicant: WIPRO LIMITED, Bangalore (IN)

(72) Inventors: Balaji Jagan, Chinnalapatti (IN); Naveen Kumar Nanjappa, Kodigehalli (IN)

(73) Assignee: Wipro Limited, Bangalore (IN)

( * ) Notice: Subject to any disclaimer, the term of this patent is extended or adjusted under 35 U.S.C. 154(b) by 314 days.

(21) Appl. No.: 16/135,001

(22) Filed: Sep. 19, 2018

(65) Prior Publication Data
US 2020/0042644 A1 Feb. 6, 2020

(30) Foreign Application Priority Data
Jul. 31, 2018 (IN) .............................. 201841028805

(51) Int. Cl.
| | |
|---|---|
| *G06N 3/04* | (2006.01) |
| *G06F 16/332* | (2019.01) |
| *G06F 40/30* | (2020.01) |
| *G06N 3/08* | (2006.01) |
| *G06N 3/00* | (2006.01) |
| *G06N 5/02* | (2006.01) |
| *G06F 16/901* | (2019.01) |
| *G06N 20/00* | (2019.01) |
| *G06N 5/04* | (2006.01) |

(52) U.S. Cl.
CPC .......... *G06F 16/3329* (2019.01); *G06F 40/30* (2020.01); *G06N 3/006* (2013.01); *G06N 3/0427* (2013.01); *G06N 3/0445* (2013.01); *G06N 3/08* (2013.01); *G06N 5/022* (2013.01); *G06F 16/9024* (2019.01); *G06N 5/041* (2013.01); *G06N 20/00* (2019.01)

(58) Field of Classification Search
CPC .. G06F 16/3329; G06F 40/30; G06F 16/9024; G06N 3/08; G06N 3/0445; G06N 3/0427; G06N 3/006; G06N 5/022; G06N 20/00; G06N 5/041
USPC ............................................................ 704/9
See application file for complete search history.

(56) References Cited

U.S. PATENT DOCUMENTS 8,819,006 B1 * 8/2014 Chechik .................. G06F 16/58
707/728
9,471,559 B2 * 10/2016 Castelli ................. G06F 40/211
(Continued)

*Primary Examiner* — Edwin S Leland, III
(74) *Attorney, Agent, or Firm* — Finnegan, Henderson, Farabow, Garrett & Dunner, LLP

(57) ABSTRACT

The present disclosure relates to a method and system for generating question variations to user input. The method comprises receiving a user input comprising at least one sentence from a user. Further, plurality of keywords and associated plurality of features are extracted from the at least one sentence. Thereafter, a plurality of question variations is generated for the user input by using one or more subgraphs identified from a trained knowledge graph based on the plurality of keywords and the associated plurality of features. The plurality of keywords and the associated plurality of features are extracted using rich semantics processing, transformation of words from one form to another and similarity. The one or more subgraphs include an entity specific graph and an action specific graph. The system and method of the present disclosure fetches real time user input and generates probable question variations for the user input.

15 Claims, 7 Drawing Sheets

(56) References Cited

U.S. PATENT DOCUMENTS

| | | | |
|---|---|---|---|
| 9,710,544 B1* | 7/2017 | Smith | G06F 40/30 |
| 10,678,822 B2* | 6/2020 | McAteer | G06F 16/3338 |
| 2011/0125734 A1* | 5/2011 | Duboue | G09B 7/00 |
| | | | 707/723 |
| 2014/0279727 A1* | 9/2014 | Baraniuk | G06N 20/00 |
| | | | 706/11 |
| 2015/0066477 A1* | 3/2015 | Hu | G06F 40/211 |
| | | | 704/9 |
| 2015/0112818 A1* | 4/2015 | Lombriser | G06Q 30/0277 |
| | | | 705/14.73 |
| 2017/0017668 A1* | 1/2017 | Steinlauf | G06F 16/5866 |
| 2017/0109355 A1* | 4/2017 | Li | G06N 3/0445 |
| 2017/0277693 A1* | 9/2017 | Mehedy | G06F 16/248 |
| 2017/0300536 A1* | 10/2017 | Gupta | G06F 16/24534 |
| 2018/0053095 A1* | 2/2018 | Farrell | G06N 20/00 |
| 2018/0082197 A1* | 3/2018 | Aravamudan | G06N 5/04 |
| 2018/0373701 A1* | 12/2018 | McAteer | G06F 16/9024 |
| 2019/0034780 A1* | 1/2019 | Marin | G06N 3/006 |
| 2019/0080225 A1* | 3/2019 | Agarwal | G06F 16/35 |
| 2019/0286750 A1* | 9/2019 | Narang | G06F 16/24578 |
| 2019/0347668 A1* | 11/2019 | Williams | H04L 67/2833 |
| 2020/0020328 A1* | 1/2020 | Gordon | G06F 21/6245 |
| 2020/0020329 A1* | 1/2020 | Gordon | G06F 3/167 |
| 2020/0042644 A1* | 2/2020 | Jagan | G06F 40/30 |
| 2020/0074322 A1* | 3/2020 | Chungapalli | G06F 40/30 |
| 2020/0142888 A1* | 5/2020 | Alakuijala | G06F 16/3338 |
| 2020/0159803 A1* | 5/2020 | Bacha | G06F 16/908 |
| 2020/0160199 A1* | 5/2020 | Al Hasan | G06F 16/90332 |

* cited by examiner

METHOD AND SYSTEM FOR GENERATING QUESTION VARIATIONS TO USER INPUT

TECHNICAL FIELD

The present disclosure relates to the field of artificial intelligence. More particularly, but not exclusively, the present disclosure relates to a method and system for generating question variations.

BACKGROUND

A Natural Language Processing (NLP) system, is an artificial intelligence system which aids in an effective interaction between computers and human beings (natural languages), The NLP system provides an efficient way, to process and analyse natural language data, thereby resolving issues faced by humans. One of the issues may be related to analysing the actual problem faced by a user based on a user input. The user input may be in the form of a query or a statement, Probability of each user asking a same question/query in different variations is very high. However, response for each of the different variations may point to a same answer, though the query/question rendered by each user may fall under different category of question type.

The existing systems merely identify the category of the question type and process the user input based on the category and provides response to the user input. Further, the existing systems do not consider the variations of a single user input which may point to the same answer i.e. questions of many forms pointing to one answer. The existing systems do not capture all possible question variations, which points to a single answer. Questions/user inputs with a very subtle change may infer different answer and questions formed with entirely different words may infer to the same answer. Therefore, generating question variations with all possibilities from user/machine perspective is a tedious task.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure discloses a method for generating question variations to user input. The method comprises receiving, by a response generation system, a user input comprising at least one sentence from a user. Further, the method comprises extracting plurality of keywords and associated plurality of features from the at least one sentence. Thereafter, the method comprises generating a plurality of question variations for the user input by using one or more subgraphs identified from a trained knowledge graph based on the plurality of keywords and the associated plurality of features. The trained knowledge graphs are generated by performing the steps of determining one or more questions from a dataset provided during a training phase, determining an association between one or more keywords extracted from the one or more questions and a context between the one or more keywords. The association between the one or more keywords represent at least one of an entity and an action, and the context between the one or more keywords are represented by one or more features. Further, generating a knowledge graph comprising the one or more features. Each of the one or more features is associated with a confidence score. The knowledge graph is used for generating one or more question variations for the dataset.

In an embodiment, the present disclosure discloses a question variation generation system, for generating question variations to user input. The question variation generation system comprises a processor and a memory, communicatively coupled with the processor, storing processor executable instructions, which, on execution causes the processor to receive a user input comprising at least one sentence from a user. Further, the processor is configured to extract plurality of keywords and associated plurality of features from the at least one sentence, Thereafter, the processor is configured to generate a plurality of question variations for the user input by using one or more subgraphs identified from a trained knowledge graph based on the plurality of keywords and the associated plurality of features. The trained knowledge graphs is generated by performing the steps of determining one or more questions from a dataset provided during a training phase, determining an association between one or more keywords extracted from the one or more questions and a context between the one or more keywords. The association between the one or more keywords represent at least one of an entity and an action, and the context between the one or more keywords are represented by one or more features. Further, generating a knowledge graph comprising the one or more features, Each of the one or more features is associated with a confidence score. The knowledge graph is used for generating one or more question variations for the dataset.

In an embodiment, the present disclosure relates to a non-transitory computer readable medium including instruction stored thereon that when processed by at least one processor cause a question variation generation system to receive a user input comprising at least one sentence from a user. Further, the instruction may further cause the processor to extract plurality of keywords and associated plurality of features from the at least one sentence, Thereafter, the instruction may further cause the processor to generate a plurality of question variations for the user input by using one or more subgraphs identified from a trained knowledge graph based on the plurality of keywords and the associated plurality of features. The trained knowledge graphs is generated by performing the steps of determining one or more questions from a dataset provided during a training phase, determining an association between one or more keywords extracted from the one or more questions and a context between the one or more keywords. The association between the one or more keywords represent at least one of an entity and an action, and the context between the one or more keywords are represented by one or more features. Further, generating a knowledge graph comprising the one or more features. Each of the one or more features is associated with a confidence score. The knowledge graph is used for generating one or more question variations for the dataset.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

Figure 1:
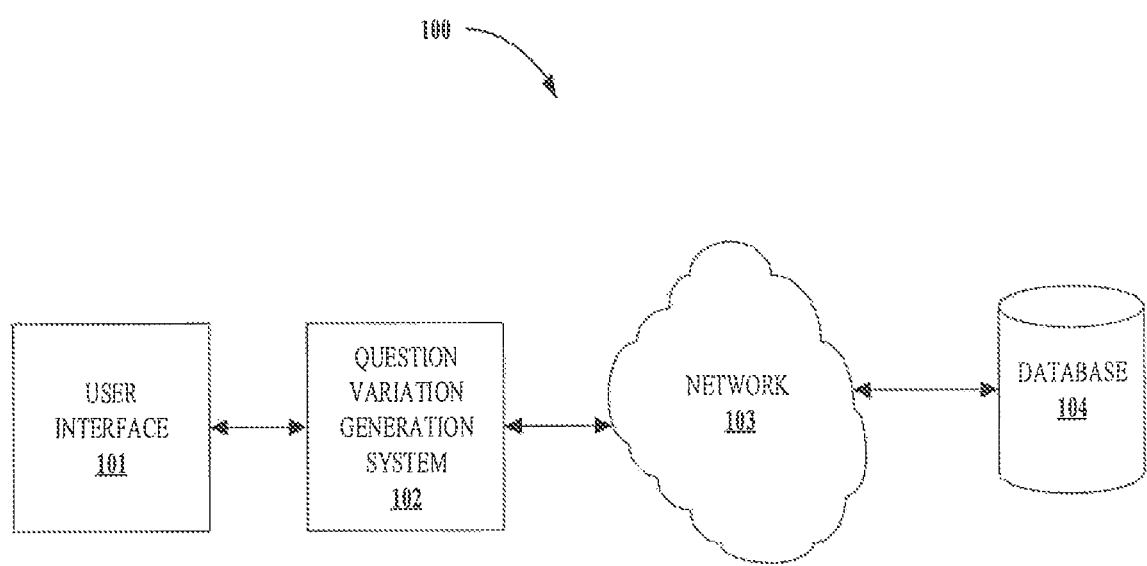
FIG. 1 shows a block diagram illustrative of an environment for generating question variations to a user input, in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION in the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative, falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relate to a method and system for generating question variations to user input. The method comprises receiving a user input comprising at least one sentence from a user. Further, plurality of keywords and associated plurality of features are extracted from the at least one sentence. Thereafter, a plurality of question variations is generated for the user input by using one or more subgraphs identified from a trained knowledge graph based on the plurality of keywords and the associated plurality of features. The plurality of keywords and the associated plurality of features are extracted using rich semantics processing, transformation of words from one form to another and similarity. The one or more subgraphs include an entity specific graph and an action specific graph. The system and method of the present disclosure fetches real time user input and generates probable question variations for the user input.

FIG. 1 shows a block diagram illustrative of an environment for generating question variations to a user input, in accordance with some embodiments of the present disclosure. The environment 100 comprises a user device comprising a user interface 101, a question variation generation system 102, a database 104, and a network 103 which connects the question variation generation system 102 and the database 104. The user interface 101 may be capable of receiving the user input. The user input may be, but not limited to, a user query, generic statements, conversations and the like. The question variation generation system 102 processes the user input and generates question variations of the user input. The network 103 communicatively connects the question variation generation system 102 to the database 104. The question variation generation system 102 may retrieve data from the database 104 for generating question variations of the user input. The user input may comprise at least one sentence and the question variation generation system 102 may extract a plurality of keywords and associated plurality of features from the at least one sentence. The associated plurality of features may be extracted based on data present in the database 104. Also, the question variation generation system 102 may update the database 104 with the user input and the corresponding question variations. The updated database may be used to generate a new response for subsequent user input. In an embodiment, the question variation generation system 102 retrieves the data from the database 104 and further processes the data to provide a response to the user input. The question variation generation system 102 generates a plurality of question variations for the user input by using one or more subgraphs identified from a trained knowledge graph based on the plurality of keywords and the associated plurality of features.

In an implementation, the question variation generation system 102 may be configured in one or more user devices (not shown) used by one or more users. In an embodiment, the one or more users may be a person or a computing system. The one or more user devices may include, but are not limited to, computing systems, such as a laptop, a computer, a desktop computer, a Personal Computer (PC), a notebook, a smartphone, a smart watch, a wearable device, a tablet, e-book readers. A person skilled in the art would understand that the question variation generation system 102 may be configured on any other device, not mentioned explicitly in the present disclosure.

In an embodiment, the user interface 101 may be a medium through which user input is received from the one or more users. In an embodiment, the user interface 101 may be a part of the question variation generation system 102 or as a separate unit. In an implementation where, the user interface 101 is a separate unit, it may be connected to the question variation generation system 102 via a wired or a wireless means. The user interface may include, but is not limited to, a keyboard, keypad, a touchpad, a mike, a camera, a mouse, a microphone, a touchscreen, a joystick, a stylus, a scanner and any other medium which is capable of receiving the input from the one or more users.

In an embodiment, the question variation generation system 102 may communicate with the database 104 via the network 103. The question variation generation system 102 may be disposed in communication with the network 103 via a network interface (not shown). The network interface may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The network 103 may include, without limitation, a direct interconnection, wired connection, e-commerce network, a peer to peer (P2P) network, Local Area Network (LAN), Wide Area Network (WAN), wireless network (e.g., using Wireless Application Protocol (WAP)), the Internet, Wireless Fidelity (Wi-Fi), etc.

In an embodiment, the database 104 may comprise the plurality of features associated with the plurality of keywords. The plurality of features may include, but not limited to metadata associated with each of one or more objects, word-based features and context-based features. The one or more objects are determined in each of one or more domains based on the plurality of keywords. Hence, the one or more objects may be defined as a device, a service provider, a person, a place or a location and any other information linked to the one or more keywords and which are relevant to the user input. Metadata is the information associated with each of the one or more objects. For an instance if camera is the object, then the metadata may comprise information regarding attributes of the camera like make of the camera, resolution, exposure, storage space, type of output generated and further the keyword camera may be semantically linked to the different type of cameras, Consider an instance where a keyword is "account", an object associated with the keyword "account" may be "bank". The word-based features comprises morphological features, semantics and syntax and the context based features comprises hierarchical relations. Consider an instance where the user input is "I want to open an account in a bank". The database 104 may comprise the word-based features like synonyms, for example, for keyword "open" may have "create" as synonym (word-based feature) and the keyword "account" may have "savings account", "fixed deposit", "recurring deposit" as semantically related features. The word-based features include synonyms, meronyms of each of the plurality of keywords. The word-based features may be extracted using Wordnet. Semantic relation may be determined using entity and action relation. For the example considered above "account" may be an entity and "create"/"open" may be action associated with the entity "account". The morphological features include parts of speech of each keyword present in the at least one sentence, sequencing of words and the like.

Figure 2:
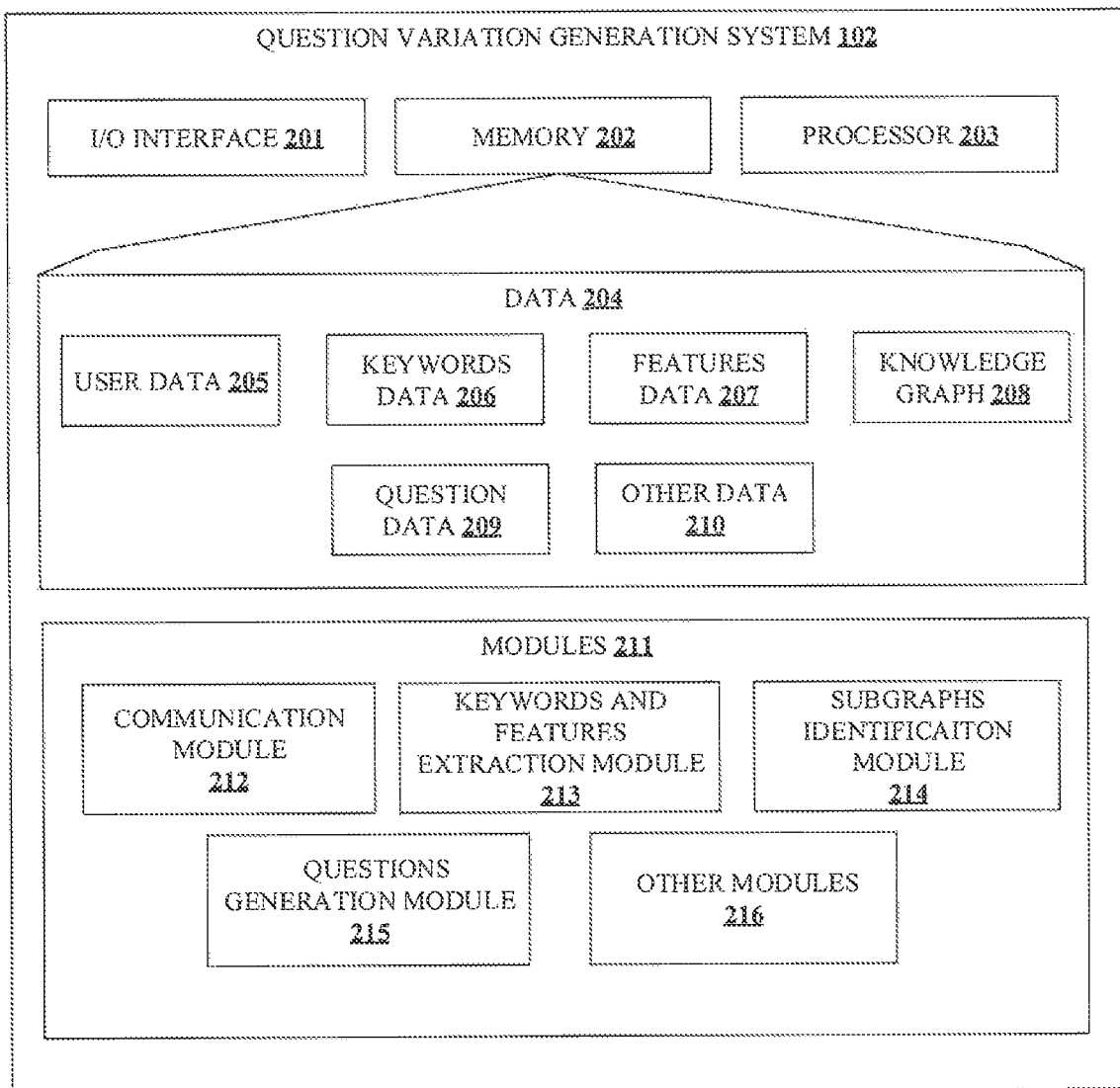
FIG. 2 shows an exemplary block diagram of a question variation generation system for generating question variations to a user input, in accordance with some embodiments of the present disclosure.

FIG. 2 shows an exemplary block diagram of a question variation generation system 102 for generating question variations to the user input, in accordance with some embodiments of the present disclosure. The question variation generation system 102 may include at least one processor 203 and a memory 202 storing instructions executable by the at least one processor 203. The processor 203 may comprise at least one data processor for executing program components for executing user or system-generated requests. The memory 202 is communicatively coupled to the processor 203. The question variation generation system 102 further comprises an Input/Output (I/O) interface 201. The I/O interface 201 is coupled with the processor 203 through which an input signal or/and an output signal is communicated. In an embodiment, the I/O interface 201 couples the user interface 101 to the question variation generation system 102.

In an embodiment, data 204 may be stored within the memory 202. The data 204 may include, for example, user data 205, keywords data 206, features data 207, knowledge graph 208, question data 209 and other data 210.

In an embodiment, the user data 205 may refer to the user input received in real-time. The user input may, but not limited to, a user query, generic statements, conversations and the like. The user input may comprise at least one sentence.

In an embodiment, the keywords data 206 may refer to the plurality of keywords extracted from the at least one sentence. The keywords data 206 may also refer to the one or more equivalents of each of the plurality of keywords.

In an embodiment, the features data 207 may refer to the plurality of features associated with the plurality of keywords. Each of the plurality of keywords are associated with a corresponding feature.

In an embodiment, the knowledge graph 208 may refer to the trained knowledge graph. The trained knowledge graph may be a part of the question variation generation system 102 or may be a separate entity. The knowledge graph 208 may comprise one or more domains such as domain 1, domain 2, domain 3, . . . , domain N. The domain 1, domain 2, domain 3, . . . , domain N can be collectively represented as a set of domains hereafter in the present disclosure. The knowledge graph 208 is a knowledge base used to enhance ability of the question variation generation system 102 to generate the plurality of question variations. The question variation generation system 102 traverses the trained knowledge graph based on the plurality of keywords and associated plurality of features extracted from the at least one sentence. Each domain of the set of domains comprises plurality of nodes. Each of the plurality of nodes is populated with keyword related to the corresponding domain. Further, each of the plurality of nodes is connected to at least one node using an edge. The edge represents the strength of connection between the two nodes. The knowledge graph 208 may be a semantic network, that represents semantic relations between concepts in a network. The knowledge graph 208 may be a directed or undirected graph consisting of vertices, which represent concepts or keywords and edges, which represent semantic relations between concepts/keywords, mapping. The plurality of keywords may be one of, but not limited to, an action and an entity. The knowledge graph 208 may comprise, but is not limited to, the set of domains like ontology, politics, tourism, healthcare, sports, devices etc. For instance, "Bear" is associated with "mammal" as bear is a "mammal". Similarly, "blue whale" is associated with "mammal" as blue whale is a "mammal". Further the edge connecting "blue whale" and "mammal" may indicate "is a largest" indicating the semantic relation between "blue whale" and "mammal".

In an embodiment, the question data 209 may refer to the plurality of questions generated for the user input. The plurality of questions may be generated using the one or more subgraphs identified from the trained knowledge graph.

In an embodiment the other data 210 may include, but is not limited to, a historical data. The historical data may refer to the plurality of questions generated for a previous user input.

In an embodiment, the data 204 in the memory 202 is processed by modules 211 of the question variation generation system 102, As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The modules 211 when configured with the functionality defined in the present disclosure will result in a novel hardware.

In one implementation, the modules 211 may include, for example, a communication module 212, a keywords and features extraction module 213, a subgraphs identification module 214, a questions generation module 215 and other modules 216. It will be appreciated that such aforementioned modules 211 may be represented as a single module or a combination of different modules.

In an embodiment, the communication module 212 receives the user input from the I/O interface 201. The user input may be in the form of text or speech.

In an embodiment, the keywords and features extraction module 213 extracts plurality of keywords and associated plurality of features from the at least one sentence. The plurality of features may include at least one of word-based features and context-based features. The word-based features may include, but not limited to, synonyms, metonyms of each of the plurality of keywords. The word-based features may be extracted using Wordnet. Semantic relation may be determined using entity and action relation. The morphological features include parts of speech of each keyword present in the at least one sentence, sequencing of words and the like. The context-based features comprise hierarchical relations. For an instance the keyword "printer" may fall under the context of "devices". Similarly, the keyword "car" may fall under the context of "automobile".

In an embodiment, the subgraphs identification module 214 helps in traversing the trained knowledge graph and helps in identifying one or more subgraphs based on the plurality of keywords and the associated plurality of features. The one or more subgraphs may be entity specific graph and action specific graph. The entity specific graph is obtained by considering the keyword in the user input representing an entity. Consider, the user input as "issue in television due to blue line". The plurality of keywords extracted may be "issue", "television", "blue line". "television" is the entity identified. Further, starting from the "television" as one of the keywords, the entity specific graph is identified. The entity specific graph denotes a link between the entity and possible actions associated with the entity. Similarly, the subgraphs identification module 214 may identify "issue" as the action. Further, starting from the action "entity" as one of the keywords, the action specific graph is identified. The action specific graph denotes a link between an action word and possible entities associated with the action word.

In an embodiment, the questions generation module 215 traverses the one or more subgraphs identified and determines the plurality of question variations based on the action specific graph and entity specific graph. In an embodiment, the questions generation module 215 may employ Bidirectional Long Short-Term Memory (Bi-LSTM) for traversing the one or more subgraphs for generating the plurality of question variation.

In an embodiment, the other modules 219 may include, but are not limited to, a display module, and a feedback module.

In an embodiment, the display module may be used to display the plurality of question variations generated for the user input. The display module may be one of, but not limited to a monitor, a Liquid Crystal Display (LCD), a Light Emitting Diode (LED) display and/or any other module present which is capable of displaying an output.

In an embodiment, the feedback module may receive feedback from each of the one or more users when the plurality of questions generated may be different from need of the user. In an embodiment, the one or more users may reword the corresponding user input when none of the questions among the plurality of questions cater to the actual requirement of the user. The rewording of the corresponding user input may be considered as the feedback.

Figure 3:
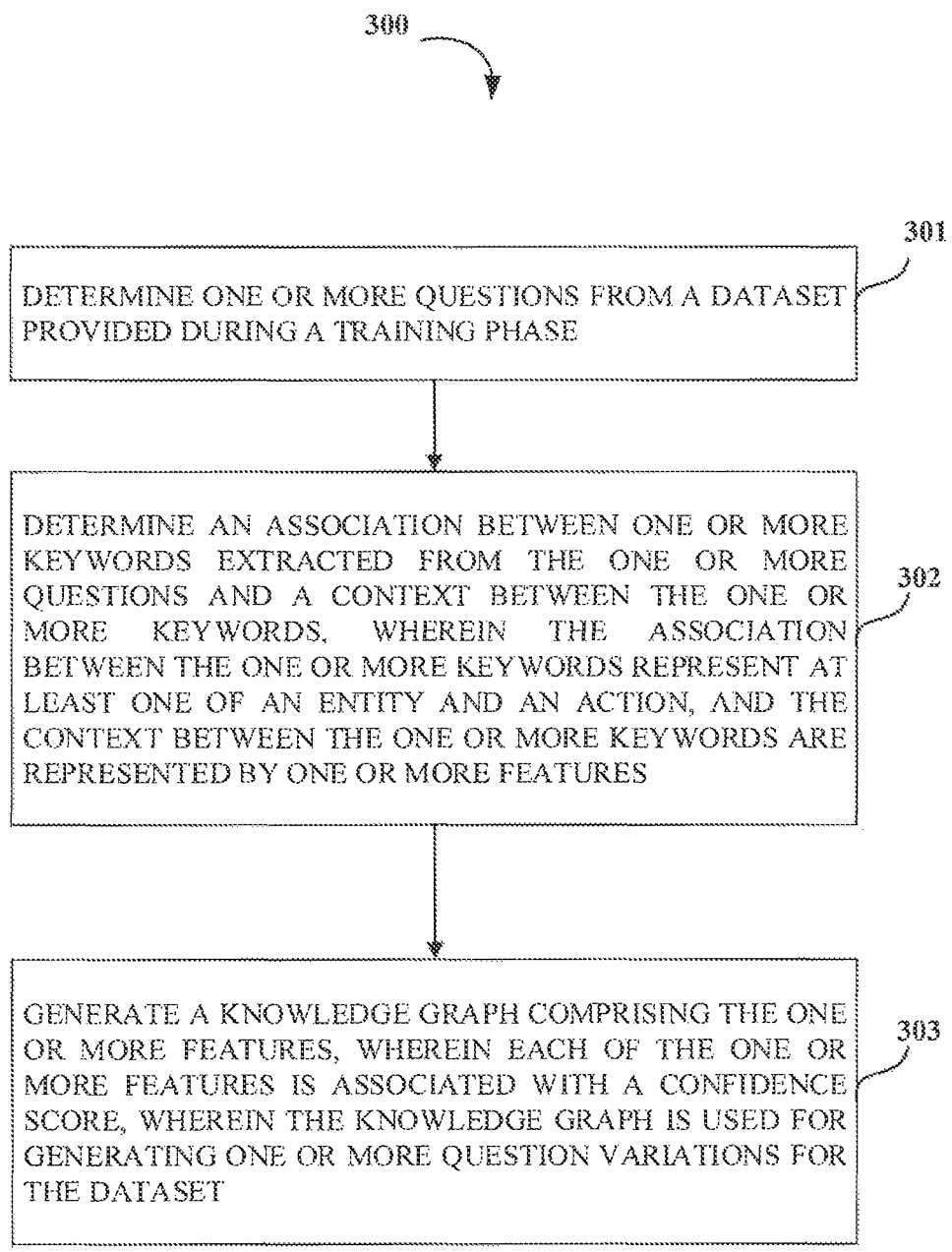
FIG. 3 shows an exemplary flow chart illustrating method steps for generating trained knowledge graph, in accordance with some embodiments of the present disclosure.

FIG. 3 shows an exemplary flow chart illustrating method steps for generating trained knowledge graph, in accordance with some embodiments of the present disclosure;

The trained knowledge graph is generated by the question variation generation system 102 using a training dataset. At step 301, the question variation generation system 102 is provided with the training dataset. The question variation generation system 102 determines one or more questions from a training dataset provided during a training phase. The training dataset consists of a list of questions, sentences, and answers for the list of questions. The list of questions comprises different types of questions such as factoid, affirmative types. The explicit questions from the training dataset may be detected automatically and the implicit question types may be detected using reinforcement learning. The implicit question may be a sequence of sentences, ending with a question word. Consider an instance, where the question is "I am facing a problem in installing the software in my laptop. My laptop is YY and the model is XXXXX. I am using a known OS and not able to install certain software. Installation is restricted for some software. Could you please guide me to resolve the issue"? The explicit questions start usually with what, when, who, and where. The 'wh' questions are mentioned above are explicit questions and the answers for the explicit questions are found in the answers directly. Each of the explicit question types present in the training database are extracted with the help of linguistic features tagged with each word and/or entire sentence. The implicit questions may be inferential questions. The implicit questions usually start with "why" and "how", The implicit questions are identified and may be extracted using reinforcement learning algorithm. Further, in an instance where the user input is in type of a paragraph, the important sentences using which the question variation generation system 102 can generate questions may be extracted using reinforcement learning. The reinforcement learning consists of a set of states, actions and rewards where each state has some actions which results in set of next states. Initially, each term in a sentence is represented as nodes and the sequence is connected through edges. Each node may connect to more than one node. Each node may be defined as a state. The process of traversing from one state to another may be dependent on the action taken place at each node. While executing each action, a reward (either positive or negative) is provided to each action. Once the action is performed, the particular state will have a set of rewards in terms of weights which indicates a confidence of each state when an action is taken place. By this way, each state has its own rewards when transitioned to another set of states. Based on the confidence of the reward, traversal from the particular state to the next state is carried out. The state with low confidence rewards leads to back propagate to the previous state and choose the next best state and execute the next best sequence path till the end state is reached. Consider an instance [how]→[to, do, will]→[configure, i, connect, install]→[the, to]→[printer, internet, network]. As illustrated in the example, the terms in the square bracket are the set of states which are connected through links. In the above example state "how" may be connected to "to", "do" and "will" through different edges. Each edge indicative of a confidence score of moving to the next state. The confidence at each state is used to traverse to the next state and hence forms a sequence. The best sequence may be selected using reinforcement learning. Thus, the question variation generation system 102 generates a one or more questions from the training dataset.

At step 302, the question variation generation system 102 determines an association between one or more keywords extracted from the one or more questions and a context between the one or more keywords, wherein the association between the one or more keywords represent at least one of an entity and an action, and the context between the one or more keywords are represented by one or more features. Variety of features including word associated features and context-based features are extracted from each of the one or more questions. Thus, word associated features like morphology may be obtained using parser (both complete and shallow) and the semantics may be obtained using WordNet (synonyms, meronyms, etc.) and hierarchical relations may be obtained using ConceptNet. Each word in each of the one or more questions may be tagged with the corresponding feature for generating the trained knowledge graph. The trained knowledge graph is built based on the confidence of individual terms and the co-occurring context. The context information may be captured to get the next best sequence when a node or a term is chosen at random.

At step 303, the question variation generation system 102 generates the trained knowledge graph comprising the one or more features, wherein each of the one or more features is associated with a confidence score. The trained knowledge graph may be defined as a network of nodes and edges with number of in-links and out-links for each node. Each node consists of the one or more keywords in association with the one or more features with the confidence measures. The confidence measure may also be word based, and context based. For instance, the occurrence of a word in a corpus with the weightage (The weightage is assigned based on the properties such as Entity tags, domain specific concepts, semantically related and similar words, etc.). Based on these confidence values, the next possible node is chosen. The confidence measures are computed based on the number of in-links and out-links at each node, word associated features such as entity tags, pos tags, WordNet, ConceptNet, etc. Each node may also consist of small nested graphs, which deals with the semantics where each word's semantic equivalent and/or semantically related terms. The small nested graphs are constructed based on the context information obtained from the training data.

Figure 4:
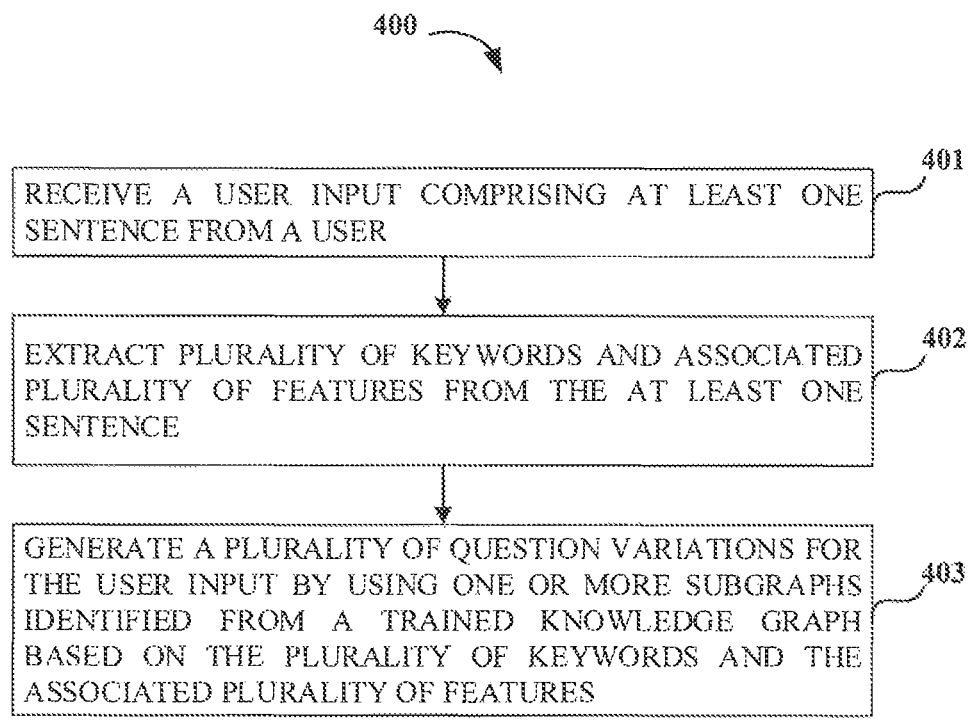
FIG. 4 shows an exemplary flow chart illustrating method steps for generating question variations to a user input, in accordance with some embodiments of the present disclosure.

FIG. 4 shows an exemplary flow chart illustrating method steps 400 for generating question variations to a user input, in accordance with some embodiments of the present disclosure;

As illustrated in FIG. 3 and FIG. 4, the method comprises one or more blocks for generating trained knowledge graph and for generating question variations for the user input respectively. The method 300 and method 400 may be described in the general context of computer executable instructions. Generally, computer executable instructions may include routines, programs, objects, components, data structures, procedures, modules, and functions, which perform particular functions or implement particular abstract data types.

The order in which the method 300 and method 400 is described is not intended to be construed as a limitation, and any number of the described method blocks may be combined in any order to implement the method. Additionally, individual blocks may be deleted from the methods without departing from the scope of the subject matter described herein. Furthermore, the method may be implemented in any suitable hardware, software, firmware, or combination thereof.

At step 401, the user input may be received by the user interface 101. The user interface 101 may be capable of receiving the user input. The user input may be, but not limited to, a user query, generic statements, conversations and the like. The user input may be received from the one or more users. In an embodiment, the one or more users may be a person or a computing system.

Figure 5A:
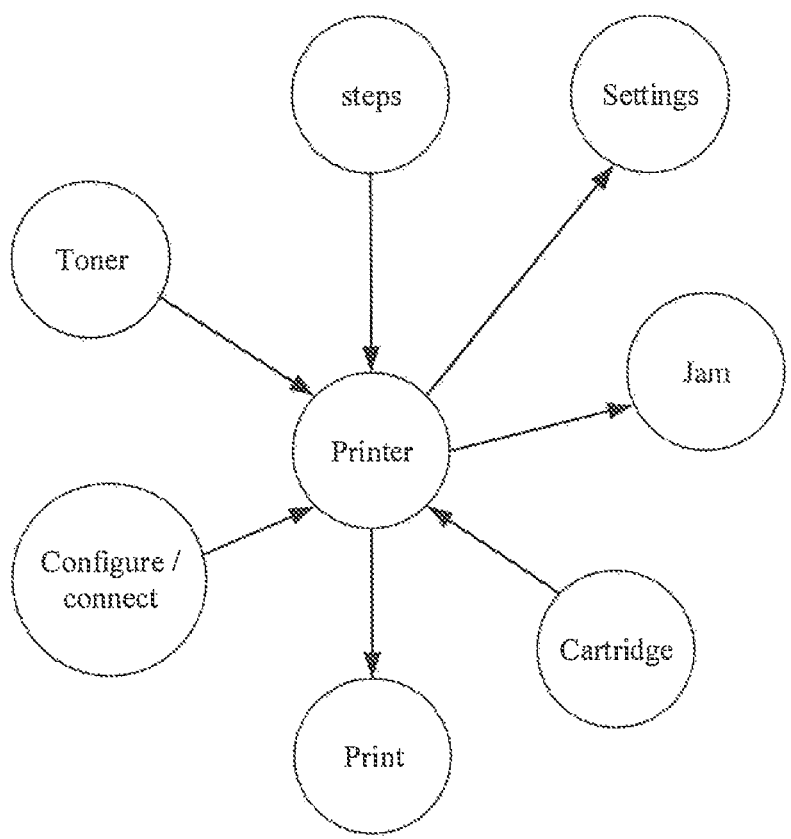
FIG. 5A shows an entity specific graph, in accordance with some embodiments of the present disclosure.
Figure 5B:
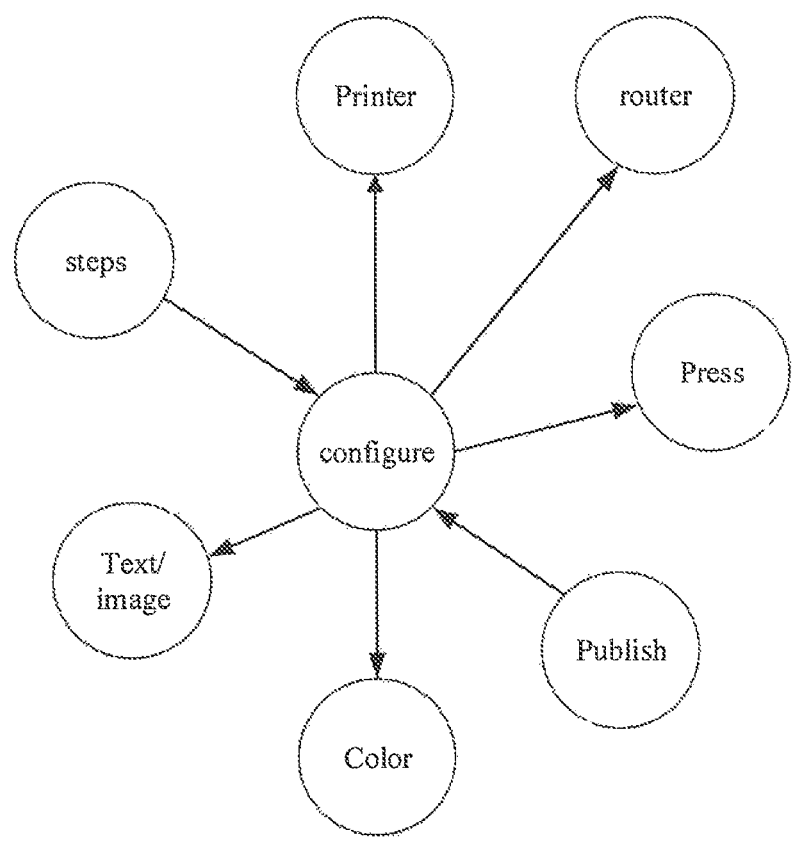
FIG. 5B shows an action specific knowledge graph, for providing a response to user input in accordance with some embodiments of the present disclosure.

At step 402, the keywords and features extraction module 213 may extract plurality of keywords and associated plurality of features from the at least one sentence. The user input is pre-processed and tagged with the appropriate word associated features. Part of Speech (POS) tags may be used for tagging each word in the user input with the respective part of speech like noun, verb, adjective and the like. Each word may be associated with its POS tag based on definition and context of the word and relation of the word with adjacent words in the sentence. In addition, the dependency related information is also tagged with the at least one sentence. Consider an instance where the object identified may be printer. Further the dependents related to the object "printer" may be "cartridge", "toner", "tray" and the like. Further, the entity specific graph and action specific graph are identified from the trained knowledge graph. The entity and action word are chosen based on the word associated features, Consider a first example, where the user input is "steps to configure the printer". The entity word may be "printer" and the action word may be "configure". Further, the entity specific graph and action specific graph may be generated by the subgraphs identification module 214 using the trained knowledge graph. FIG. 5A illustrates the entity specific graph generated for the first example. As illustrated in FIG. 5A the entity specific graph denotes a link between the entity "printer" and possible actions associated with the entity. FIG. 5B illustrates the action specific graph generated for the first example. As illustrated in FIG. 5B the action specific graph denotes a link between an action word "configure" and possible entities associated with the action word.

At step 403, the questions generation module 215 generates a plurality of question variations for the user input by using the one or more subgraphs identified from the trained knowledge graph based on the plurality of keywords and the associated plurality of features. The question variations may be generated with the help of spreading activation algorithm applied on the trained knowledge graph. The Spreading Activation activates the starting node selected at random. Then, by incrementally find the next possible best sequence (based on the confidence score of each node and edge), the question is generated. While expanding the learning using BiLSTM, the features associated with each node are getting triggered and the sequence is validated with the help of the categorical and statistical features associated with each nodes and edges. The categorial features may be POS tags, semantic category, synonyms and the like. The statistical features may be weightage and confidence measures associated with each node and edges. Further, BiLSTM may be used to generate and validate the sequence selected by the spreading activation algorithm. The plurality of questions generated for the first example may be as indicated in the Table 1.

Ire FIGS. 5A and 5B representing the entity specific and action specific knowledge graphs respectively the Spreading activation algorithm may be used to activate the important nodes (selected based on the concept tags in the question) in each of the knowledge graphs (both entity and action specific). With the help of the confidence measures, the traversal continues in the selection of nodes which forms the sequence. Further, the possible sequences may be obtained from the action specific and entity specific knowledge graphs. Using the possible sequences the semantically equivalent and semantically related question variations may be generated.

TABLE 1

Figure 6:
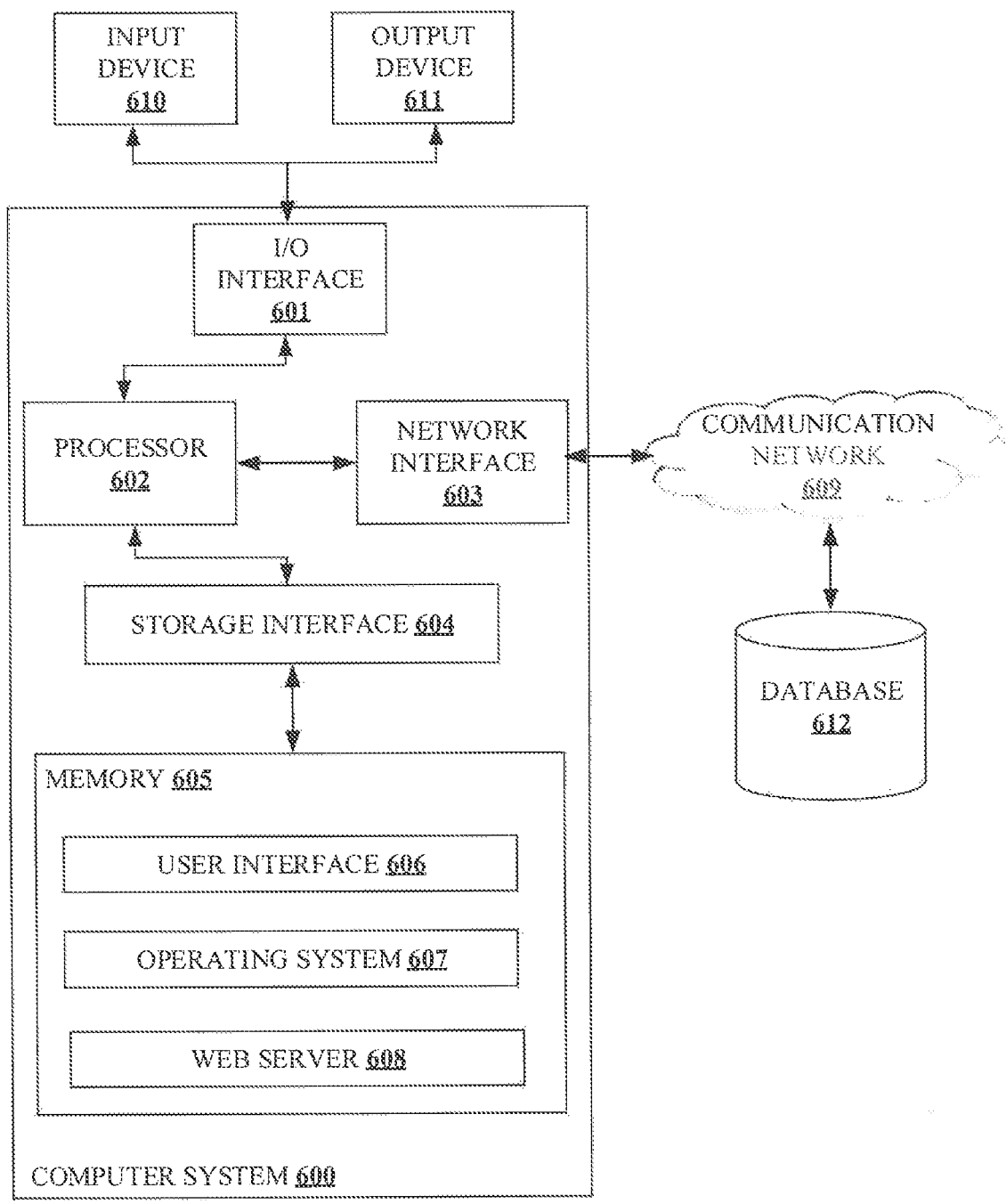
FIG. 6 illustrates a block diagram of an exemplary computer system for implementing embodiments consistent with the present disclosure.

How to configure the printer
What are the steps to configure the printer
How to install the printer
How to connect to the printer
What are the steps to install the printer etc Computer System FIG. 6 illustrates a block diagram of an exemplary computer system 600 for implementing embodiments consistent with the present disclosure. In an embodiment, the computer system 600 is used to implement the question variation generation system 102. The computer system 600 may comprise a central processing unit ("CPU" or "processor") 602. The processor 602 may comprise at least one data processor for executing program components for generating question variations to the user input. The processor 602 may include specialized processing units such as integrated system (bus) controllers, memory management control units, floating point units, graphics processing units, digital signal processing units, etc.

The processor 602 may be disposed in communication with one or more input/output (I/O) devices (not shown) via I/O interface 601. The I/O interface 601 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), Wi/Max, or the like), etc.

Using the I/O interface 601, the computer system 600 may communicate with one or more I/O devices. For example, the input device 610 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 611 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 600 is connected to the database 612 through a communication network 609. The processor 602 may be disposed in communication with the communication network 609 via a network interface 603. The network interface 603 may communicate with the communication network 609. The network interface 603 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 609 may include, without limitation, a direct interconnection, local area network (LAN), wide area network (WAN), wireless network (e.g., using Wireless Application Protocol), the Internet, etc. Using the network interface 603 and the communication network 609, the computer system 600 may communicate with the knowledge graph 612 and the database 613. The network interface 603 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 609 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 602 may be disposed in communication with a memory 605 (e.g., RAM, ROM, etc. not shown in FIG. 7) via a storage interface 604. The storage interface 604 may connect to memory 605 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives further include a drum, magnetic disc drive, magneto-optical drive, optical drive, Redundant Array of Independent Discs (RAID) solid-state memory devices, solid-state drives, etc.

The memory 605 may store a collection of program or database components, including, without limitation, user interface 606, an operating system 607, web server 608 etc. In some embodiments, computer system 600 may store user/application data 606, such as, the data, variables, records, etc., as described in this disclosure. Such databases may be implemented as fault-tolerant, relational, scalable, secure databases such as Oracle® or Sybase®.

The operating system 607 may facilitate resource management and operation of the computer system 600. Examples of operating systems include, without limitation, APPLE MACINTOSH® OS X, UNIX®, UNIX-like system distributions (E.G., BERKELEY SOFTWARE DISTRIBUTION™ (BSD), FREEBSD™. NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some embodiments, the computer system 600 may implement a web browser 608 stored program component. The web browser 608 may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 608 may utilize facilities such as AJAX™, DHTML™, ADORE® FLASH™, JAVASCRIPT™, JAVA™, Application Programming Interfaces (APIs), etc. In some embodiments, the computer system 600 may implement a mail server stored program component. The mail server may be an Internet mail server such as Microsoft Exchange, or the like. The mail server may utilize facilities such as ASP™, ACTIVEX™, ANSI™ C++/C#, MICROSOFT®, .NET™, CGI SCRIPTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT' exchange, Post Office Protocol (POP), Simple Mail Transfer Protocol (SMTP), or the like. In some embodiments, the computer system 600 may implement a mail client stored program component. The mail client may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, nonvolatile memory, hard drives, CD ROMs, DVDs, flash drives, disks, and any other known physical storage media.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated method of FIG. 3 shows certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

In an embodiment, the system and method as disclosed in the present disclosure, may be used for generating plurality of question variations to the user input in real time In an embodiment, the system and method as disclosed in the present disclosure, may be used in user-agent interaction related applications like question answering system, chat-bots, conversation engine.

In an embodiment, the system and method as disclosed in the present disclosure, may solve the ambiguity between different questions, and aids in identifying the redundant hidden information In an embodiment, the system and method as disclosed in the present disclosure, may be widely used in Human Machine Interaction (HMI) systems.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference number | Description |
| --- | --- |
| 100 | Environment |
| 101 | User Interface |
| 102 | Question variation generation system |
| 103 | Network |
| 104 | Database |
| 201 | I/O interface |
| 202 | Memory |
| 203 | Processor |
| 204 | Data |
| 205 | User input |

-continued

| Reference number | Description |
| --- | --- |
| 206 | Keywords data |
| 207 | Features data |
| 208 | Knowledge graph |
| 209 | Question data |
| 210 | Other data |
| 211 | Modules |
| 211 | Modules |
| 212 | Communication module |
| 213 | Keywords and features extraction module |
| 214 | Subgraphs identification module |
| 215 | Questions generation module |
| 216 | Other modules |
| 600 | Computer System |
| 601 | I/O Interface |
| 602 | Processor |
| 603 | Network Interface |
| 604 | Storage Interface |
| 605 | Memory |
| 606 | User Interface |
| 607 | Operating System |
| 608 | Web Server |
| 609 | Communication Network |
| 710a, . . . , 710n | Input Devices |
| 711a, . . . , 711n | Output device |
| 712 | Database |

We is claimed is:

1. A method for generating question variations to user input, said method comprising:
receiving, by a response generation system, a user input comprising at least one sentence from a user;
extracting, by the response generation system, plurality of keywords and associated plurality of features from the at least one sentence;
generating, by the response generation system, a plurality of question variations for the user input by using one or more subgraphs identified from a trained knowledge graph based on the plurality of keywords and the associated plurality of features, wherein the plurality of question variations comprises of one or more explicit questions and one or more implicit question, wherein the plurality of question variations are generated by performing the steps of:
determining the one or more explicit questions automatically from a dataset provided during a training phase;
detecting the one or more implicit question by using reinforcement learning algorithm, wherein the reinforcement learning algorithm comprises of a set of states, corresponding actions and assigned rewards, wherein each state is related to the corresponding actions which results in a set of next states;
executing corresponding actions on each state, wherein a reward is assigned to each state in a form of a confidence score, wherein the confidence score at each state is used to traverse to the set of next state to form a sequence; and
selecting the sequence with the highest confidence to determine the one or more implicit questions.

2. The method as claimed in claim 1, wherein the plurality of features may include at least one of word-based features and context-based features, wherein the word-based features comprises morphological features, semantics and syntax and the context-based features comprises hierarchical relations.

3. The method as claimed in claim 1, wherein the one or more subgraphs comprise at least one of an action specific graph and an entity specific graph, wherein the action specific graph denotes a link between an action word and possible entities associated with the action word and wherein the entity specific graph denotes a link between the entity and possible actions associated with the entity.

4. The method as claimed in claim 1, wherein the one or more questions are determined using reinforcement learning.

5. The method as claimed in claim 1, wherein the trained knowledge graph is generated using bidirectional LSTM (Long Short-Term Memory) and wherein the association is determined using spreading activation.

6. A question variation generation system, for generating question variations to user input, said system comprising:
a processor; and
a memory, communicatively coupled with the processor, storing processor executable instructions, which, on execution causes the processor to:
receive, a user input comprising at least one sentence from a user;
extract, plurality of keywords and associated plurality of features from the at least one sentence;
generate, a plurality of question variations for the user input by using one or more subgraphs identified from a trained knowledge graph based on the plurality of keywords and the associated plurality of features, wherein the plurality of question variations comprises of one or more explicit questions and one or more implicit question, wherein the plurality of question variations are generated by performing the steps of:
determining the one or more explicit questions automatically from a dataset provided during a training phase;
detecting the one or more implicit question by using reinforcement learning algorithm, wherein the reinforcement learning algorithm comprises of a set of states, corresponding actions and assigned rewards, wherein each state is related to the corresponding actions which results in a set of next states;
executing corresponding actions on each state, wherein a reward is assigned to each state in a form of a confidence score, wherein the confidence score at each state is used to traverse to the set of next state to form a sequence; and
selecting the sequence with the highest confidence to determine the one or more implicit questions.

7. The question variation generation system as claimed in claim 6, wherein the plurality of features may include at least one of word-based features and context-based features, wherein the word-based features comprises morphological features, semantics and syntax and the context-based features comprises hierarchical relations.

8. The question variation generation system as claimed in claim 6, wherein the one or more subgraphs comprise at least one of an action specific graph and an entity specific graph, wherein the action specific graph denotes a link between an action word and possible entities associated with the action word and wherein the entity specific graph denotes a link between the entity and possible actions associated with the entity.

9. The question variation generation system as claimed in claim 6, wherein the one or more questions are determined using reinforcement learning.

10. The question variation generation system as claimed in claim 6, wherein the trained knowledge graph is generated using bidirectional LSTM (Long Short-Term Memory) and wherein the association is determined using spreading activation.

11. A non-transitory computer readable medium including instructions stored thereon that when processed by at least one processor cause a question variation generation system to perform operations comprising:
- receiving, a user input comprising at least one sentence from a user;
- extracting, plurality of keywords and associated plurality of features from the at least one sentence;
- generating, a plurality of question variations for the user input by using one or more subgraphs identified from a trained knowledge graph based on the plurality of keywords and the associated plurality of features, wherein the plurality of question variations comprises of one or more explicit questions and one or more implicit question, wherein the plurality of question variations are generated by performing the steps of:
  - determining the one or more explicit questions automatically from a dataset provided during a training phase;
  - detecting the one or more implicit question by using reinforcement learning algorithm, wherein the reinforcement learning algorithm comprises of a set of states, corresponding actions and assigned rewards, wherein each state is related to the corresponding actions which results in a set of next states;
  - executing corresponding actions on each state, wherein a reward is assigned to each state in a form of a confidence score, wherein the confidence score at each state is used to traverse to the set of next state to form a sequence; and
  - selecting the sequence with the highest confidence to determine the one or more implicit questions.

12. The medium as claimed in claim 11, wherein the plurality of features may include at least one of word-based features and context-based features, wherein the word-based features comprises morphological features, semantics and syntax and the context-based features comprises hierarchical relations.

13. The medium as claimed in claim 11, wherein the one or more subgraphs comprise at least one of an action specific graph and an entity specific graph, wherein the action specific graph denotes a link between an action word and possible entities associated with the action word and wherein the entity specific graph denotes a link between the entity and possible actions associated with the entity.

14. The medium as claimed in claim 11, wherein the one or more questions are determined using reinforcement learning.

15. The medium as claimed in claim 11, wherein the trained knowledge graph is generated using bidirectional LSTM (Long Short-Term Memory) and wherein the association is determined using spreading activation.

* * * * *